United States Patent [19]

Astrom et al.

[11] Patent Number: 4,695,376
[45] Date of Patent: Sep. 22, 1987

[54] FLOATING DECANTER

[75] Inventors: Gordon L. Astrom, Mount Morris, Ill.; Ronald J. Weis, South Beloit, Wis.; Wesley M. Shubert, Ames, Iowa

[73] Assignee: Aqua-Aerobic Systems, Inc., Rockford, Ill.

[21] Appl. No.: 920,760

[22] Filed: Oct. 20, 1986

[51] Int. Cl.[4] ............................................. B01D 17/00
[52] U.S. Cl. ................................. 210/122; 210/242.1; 210/523; 210/923
[58] Field of Search ............ 210/121, 122, 237, 242.1, 210/242.3, 523, 527, 923, 236, 248, 525, 540

[56] References Cited

U.S. PATENT DOCUMENTS

| | | | |
|---|---|---|---|
| 1,450,545 | 4/1923 | Hans | 210/122 |
| 1,605,207 | 11/1926 | Bitte | 210/242.1 |
| 1,644,248 | 11/1927 | Goldman | 210/242.1 |
| 4,154,678 | 5/1979 | Kole | 210/242.1 |
| 4,290,887 | 9/1981 | Brown et al. | 210/242.1 |
| 4,405,458 | 9/1983 | McHugh, Jr. | 210/242.3 |
| 4,431,536 | 2/1984 | Thompson | 210/242.3 |
| 4,512,883 | 4/1985 | Thompson | 210/242.3 |
| 4,596,658 | 6/1986 | Mandt | 210/626 |
| 4,601,833 | 7/1986 | Shubert | 210/242.1 |

FOREIGN PATENT DOCUMENTS

| | | | |
|---|---|---|---|
| 52-60 | 1/1977 | Japan | 210/242.1 |
| 145510 | 11/1980 | Japan | 210/242.1 |
| 13556 | of 1908 | United Kingdom | 210/242.1 |

OTHER PUBLICATIONS

"Technology Evaluation of Sequencing Batch Reactors", Contract #68-03-1821, by James M. Montgomery, Consulting Engineers, Inc., Sep. 1984, pp. 4-1 through 4-11, FIGS. 4 through 11.

Primary Examiner—Richard V. Fisher
Assistant Examiner—Richard D. Jordan
Attorney, Agent, or Firm—Vernon J. Pillote

[57] ABSTRACT

A floating decanter apparatus including a float adapted to buoyantly support the decanter apparatus, a decanter receptacle disposed below the float and having an open top surrounded by a peripheral upper decanter rim and outlet means for decanted liquid communicating with said decanter receptacle at a level below said decanter rim. The decanter receptacle is mounted on the float for movement toward and away from the underside of the float and a power operated actuator is mounted on the float and operatively connected to the decanter receptacle for selectively moving the decanter receptacle from a lower position in the decanter rim spaced below the underside of the float to a raised position to seal the decanter rim to the underside of the float.

13 Claims, 4 Drawing Figures

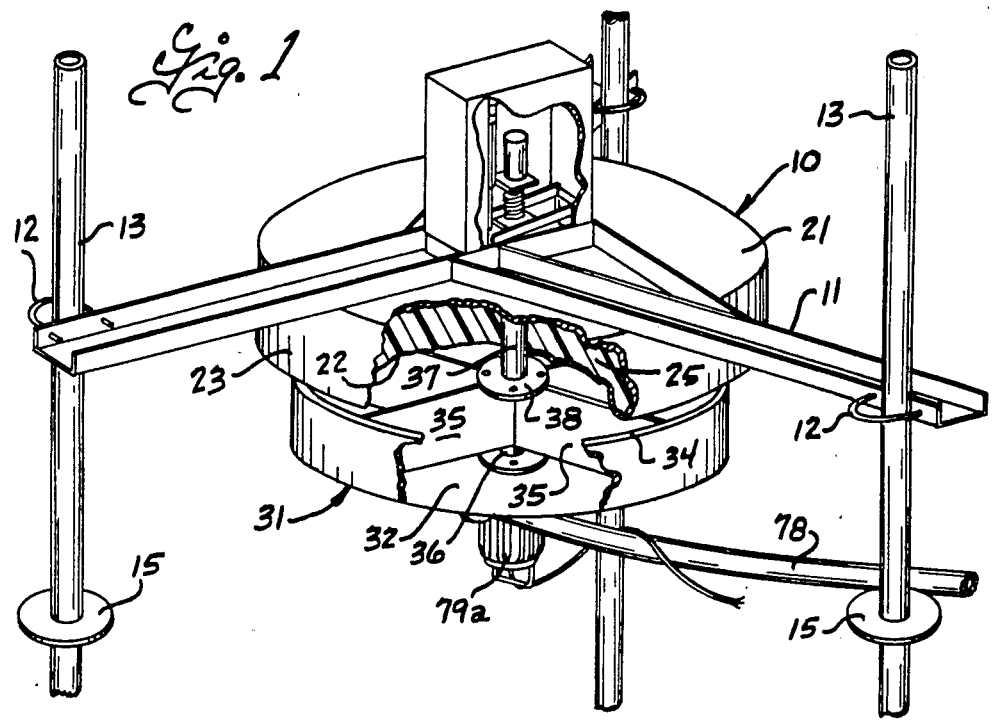
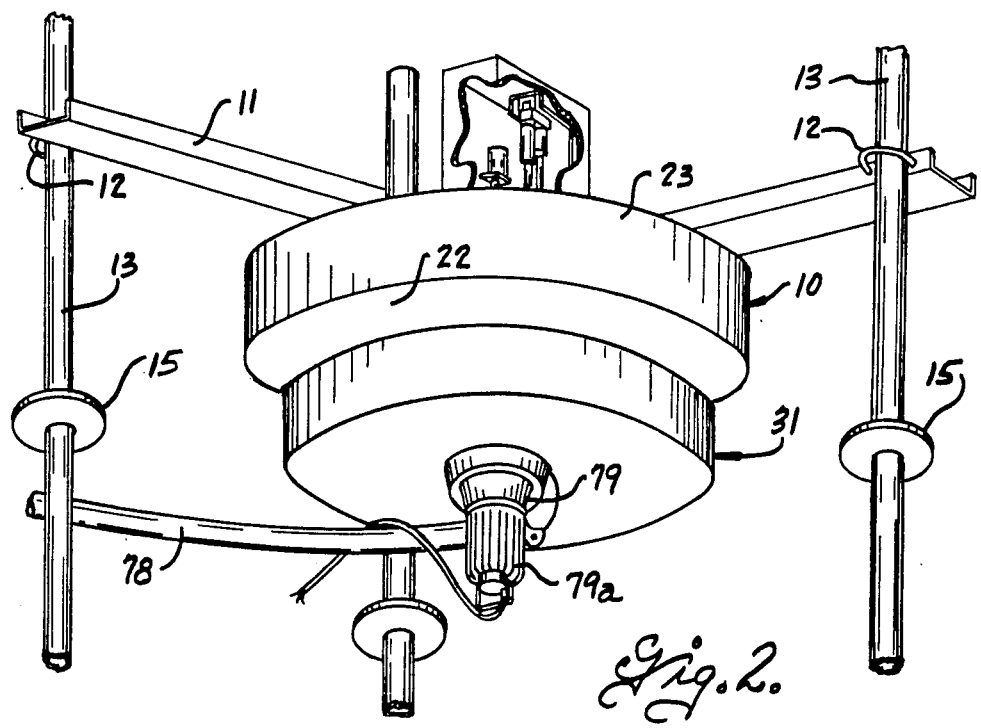

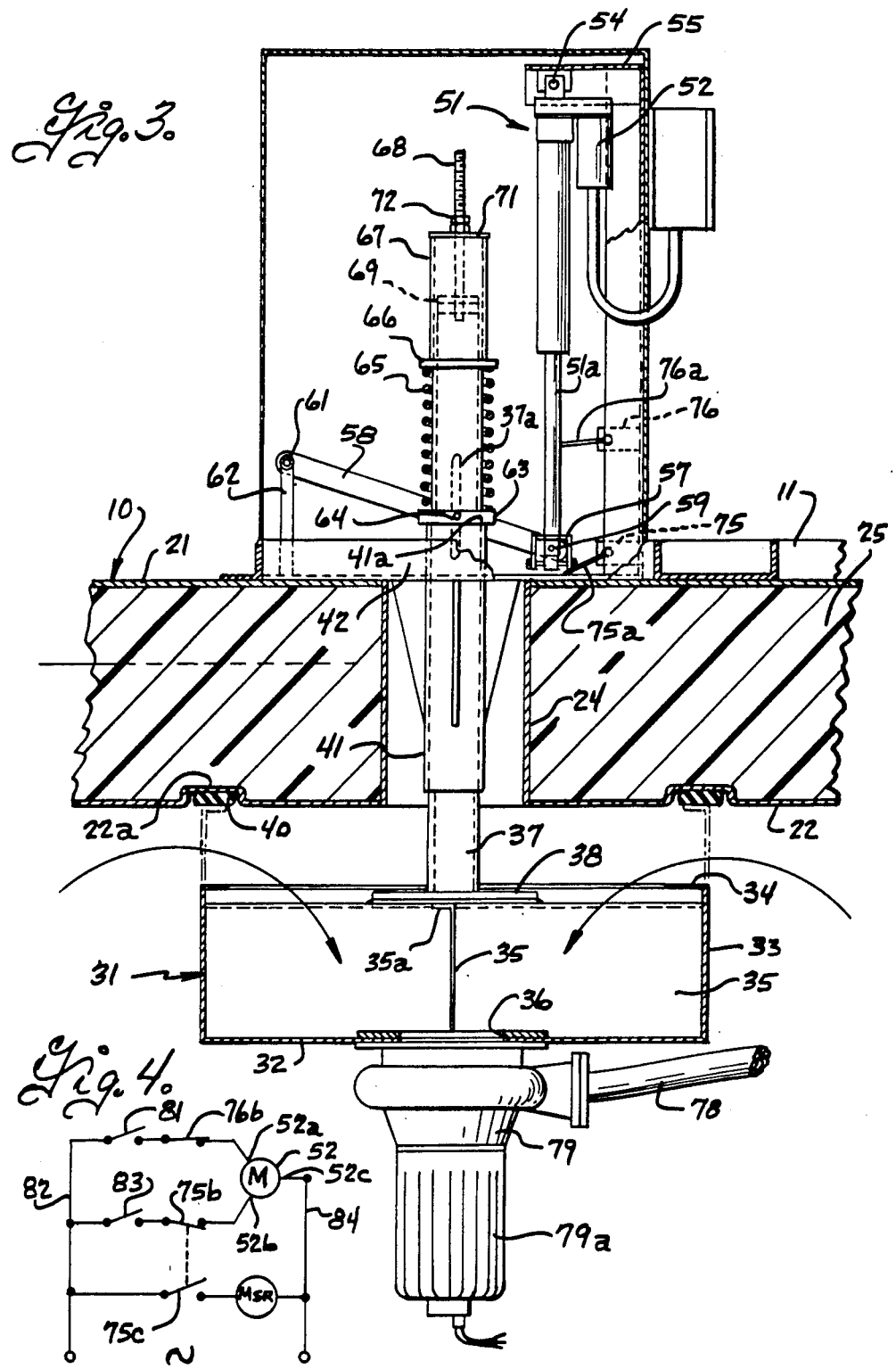

FLOATING DECANTER

BACKGROUND OF THE INVENTION

In the sequencing batch reactor process of waste water treatment, a basin or reactor is operated in a batch treatment mode involving a fill phase, a react phase, a settle phase, and a decant phase. In general, the basin is filled with waste water during the fill phase, mixed and aerated either continuously or intermittently during the react phase; the suspended solids allowed to settle during the settle phase; and the relatively clear supernatent withdrawn during the decant phase. The duration and timing of the several phases can vary in different installations and some of the phases can overlap.

The quality of the effluent withdrawn during the decant phase is markedly affected by the decanter design. While most of the suspended solids settle to the bottom during the settle phase, some solids do not settle but instead float on the surface of the basin. If the decanter draws in floating solids or pulls in lighter sludge from the lower levels in the tank during the decant phase, the effluent quality is adversely affected. Moreover, if the suspended solids enter the decanter during the fill, react and settle phases, they will be subsequently discharged with the decanted effluent during the decant phase and adversely affect the quality of the effluent.

Various different decanter designs are illustrated and described in an article entitled "Technology Evaluation of Sequencing Batch Reactors", dated September 1984, and submitted to the U.S. Environmental Protection Agency, Environmental Research Center, Cincinnati, Ohio, Contract No. 68-03-1821, by James M. Montgomery Consulting Engineers, Inc., pages 4-1 through 4-11, FIGS. 4 through 11. Some employ a fixed decanter head and some others provide a decanter head that floats so as to always withdraw from the upper layer of liquid in the basin. As pointed out in the aforementioned article, preventing entrance of solids into the decanter head and piping during the fill, react and settle phases has presented a major problem. Some decanter designs, for example as disclosed in U.S. Pat. No. 4,596,658, provide a special upwardly directed decanting orifice zone that communicates at its lower end with the water in the basin and which has an air retention zone at the upper end of the decanter orifice zone to inhibit entrance of solids into the decanter during the fill, react and settle phases. It has also been proposed as disclosed in U.S. Pat. No. 4,601,833 to provide a floating decanter and to lift the decanter entirely out of the water in the basin during the fill, react and settle phases, and to provide a trough to cover the inlet of the decanter during lifting the decanter out of the basin and lowering of the decanter back into the basin, to prevent entrance of floating debris.

SUMMARY OF THE INVENTION

The general object of the present invention is to provide a floating decanter which is selectively operable to mechanically seal the decanter against entrance of liquid and foreign material into the decanter except during the decant phase.

Another object of this invention is to provide a floating decanter in accordance with the foregoing object, which draws effluent at a preselected level beneath the surface of the liquid to prevent floating debris from entering the decant system and which also limits the entrance velocities of the fluid entering the decanter to avoid pulling lighter sludge up from the bottom of the basin during the decant phase.

Accordingly, the present invention provides a floating decanter comprising a float adapted to float in a body of liquid and a decanter receptacle disposed below the float and having an open top surrounded by a peripheral decanter rim and outlet means for decanted liquid communicating with the decanter receptacle at a level below the decanter rim. The decanter receptacle is mounted on the float for movement toward and away from the underside of the float and seal means are provided and operative when the decanter is moved toward the float to a preselected raised position for sealing the decanter rim to the underside of the float to substantially prevent flow of liquid and foreign material from the body of liquid into the decanter receptacle. A power operated actuator means is mounted on the float and operatively connected to the decanter receptacle for selectively moving the decanter receptacle from a lower position in which the decanter rim is spaced below the underside of the float to a raised position to seal the decanter rim to the underside of the float.

BRIEF DESCRIPTION OF THE DRAWINGS

FIG. 1 is a fragmentary perspective view of a floating decanter embodying the present invention with the decanter in an open position and with parts broken away and shown in section to illustrate details of construction;

FIG. 2 is a fragmentary perspective view of the floating decanter of FIG. 1, illustrating the decanter in a closed position;

FIG. 3 is a fragmentary vertical sectional view through the decanter showing the decanter in an open position; and FIG. 4 is a schematic electrical diagram for the decanter operating mechanism.

DETAILED DESCRIPTION

The floating decanter of the present invention is adapted for use in installations such as in sequencing batch reactors wherein it is desired to decant liquid from a tank or basin at some times and to prevent inflow of liquid and foreign material into the decanter at other times. A floating decanter apparatus includes a float 10 adapted to buoyantly support the decanter apparatus in a body of liquid in a pond or basin. The decanter apparatus is preferably anchored in such a manner as to maintain the decanter apparatus at a preselected location in the pond or basin, while allowing the decanter apparatus to rise and fall with the liquid level in the basin. As shown in FIGS. 1 and 2, arms 11 are attached to the float 10 and extend outwardly from the float and have loops or eyes 12 at their outer ends that are guidably supported on posts 13 anchored in the floor or bed of the basin. Alternatively, means such as mooring cables can be used to anchor the decanter apparatus at a selected location. Stops 15 are advantageously provided on the posts 13 and arranged to engage the arms 11 to prevent downward movement of the float below a preselected minimum liquid level in the tank or basin.

In the preferred embodiment illustrated, the float is in the form of an annulus having a top wall 21, bottom wall 22, peripheral side wall 23 and a central casing 24 (FIG. 3) extending between the top and bottom walls. The walls of the float may be formed of a metal such as stainless steel or fiber glass and the float is advantageously filled with a light weight filler such as polyurethane foam 25.

A decanter receptacle 31 is disposed below the float and has a bottom wall 32, a peripheral side wall 33 and a peripheral rim 34 surrounding the open top of the decanter receptacle. The decanter preferably has a generally circular configuration and has an outlet opening 36 in the bottom wall 32 generally concentric with the peripheral side wall 33 and rim 34. Baffles 35 are provided in the decanter receptacle and extend from the center to the outer peripheral wall 33 and divide the decanter receptacle into a plurality of sectors each of which communicates at its radially inner end with the outlet 36 to substantially equalize inflow of liquid around the peripheral rim 34 of the decanter receptacle. The upper edges of the baffles 35 are spaced below the rim 34 of the decanter and have stiffening flanges 35a at their upper edges. An elongated guide member 37 such as a tube or pipe is attached at its lower end to the decanter receptacle to extend generally coaxially thereof and perpendicular to the plane of the rim 34. As shown, the guide member 37 has a mounting flange 38 at its lower end that is secured as by fasteners, welding or the like to the upper edges of the baffles 35.

The decanter receptacle is guidably mounted on the float for movement toward and away from the underside of the float. As best shown in FIG. 3, a guide sleeve 41 is attached as by a channel shaped mounting member 42 to the float 10 and guidably receives the guide member 37 on the decanter receptacle to support the latter for movement between a lower position as shown in FIG. 3 in which the rim 34 of the decanter receptacle is spaced below the underside of the float, and a raised position as shown in phantom lines in FIG. 3. A seal means is provided for sealing the rim of the decanter receptacle to the underside of the float when the decanter receptacle is in its raised position. The seal means can be provided on either the underside of the float or on the decanter rim or both and, in the preferred embodiment illustrated, the seal means is in the form of annular ring of resilient sealing material such as rubber, soft plastic or the like affixed to the underside of the float. As shown in FIG. 3, the float is advantageously formed with an annular depression 22a in its underside for receiving the seal ring 40 and such that the underside of the seal ring is disposed adjacent the plane of the bottom wall 22.

A power operated actuator 51 is provided for selectively removing the decanter receptacle from a lower position spaced below the float to a raised position engaging the seal means to seal the decanted rim to the underside of the float. The actuator 51 has an electroresponsive operator such as a reversible electric motor 52 to facilitate selective and reversible operation of the actuator from a remote location. In the embodiment illustrated, the actuator is a linear type electromechanical actuator such as a linear ball screw actuator of conventional construction in which the actuator member 51a is extended when the electric drive motor 52 is operated in one direction and retracted when the drive motor is operated in the other direction. As will be understood by those skilled in the art, the actuator could also be of the electrohydraulic type. As best shown in FIG. 3, the actuator 51 is pivotally mounted at its upper end on a pivot 54 carried by a bracket 55 attached to the float. The lower end of the actuator member 51a is operatively connected to the guide member 37 to raise and lower the decanter. More particularly, a crosshead 57 is attached to the lower end of the actuator member 51a. A pair of links 58 are pivotally connected at one end by pivot means 59 to the crosshead head 57 and pivotally connected at their other ends by pivot means 61 to a bracket 62 secured to the mounting member 42 on the upper side of the float. The links 58 are connected to the guide member 37 in a manner to permit limited overtravel of the actuator member 51a when the decanter receptacle reaches its raised or closed position. For this purpose, a collar 63 loosely surrounds the upper end of the guide member 37 and a pin 64 extends diametrically through the collar 63 and is pivotally connected at its ends to the links 58 at a location intermediate their ends. The guide member 37 has a vertically elongated slot 37a to receive the pin 64 and allow limited vertical movement of the collar relative to the member 36. The collar 63 is arranged to engage the upper end 41a of the guide sleeve 41 when the actuator member 51a is in a lower or extended position as shown in FIG. 3. Collar 63 also defines an upwardly facing spring abutment and a coil type compression spring 65 is disposed around the upper end of the guide member 37 between the collar 63 and a second or upper spring abutment 66. The upper abutment 66 is fixed to the lower end of a sleeve 67 and an adjusting screw 68 is anchored at its lower end in a crosshead 69 on the upper end of the guide member 37 and extends through a cap 71 on the sleeve 67. Adjusting nuts 72 are threadedly mounted on the adjusting screw 68. As will be seen from FIG. 3, the spring 65 will be compressed due to the weight of the decanter receptacle and any attachments thereto and the spacing of the decanter receptacle from the float when the decanter receptacle is in its lower or open position can be adjusted by nuts 72. Turning the nuts 72 downwardly on the screw decreases the spacing of the decanter receptacle from the float in its open position and turning the nuts upwardly on the screw 68 increases the spacing of the decanter receptacle relative to the float, in its open position.

Lower and upper limit switches 75 and 76 are mounted on the support bracket 55 to sense when the member 51a of the linear actuator 57 reaches a preselected lower and a preselected raised position respectively. As shown, switches 75 and 76 have switch operators 75a and 76a, respectively arranged to engage the crosshead 57 on the lower end of the actuator. Switch 75a is positioned so as to be actuated by the crosshead on the linear actuator when the actuator member 51a reaches a preselected lower or extended position in which the decanter receptacle is spaced below the float in an open condition, and switch 76 is positioned so as to be actuated only after the actuator has moved the collar 63 a distance somewhat greater than the distance required to raise the decanter receptacle to its closed position, and such that the collar further compresses the spring 65 to yieldably press the rim of the decanter receptacle against the seal 40. This provides a firm mechanical seal between the rim of the decanter receptacle and the underside of the float, to substantially prevent entrance of liquid from the basin into the decanter receptacle.

The outlet 36 of the decanter receptacle is connected to an effluent decant or discharge line 78. In some installations the decant line can be arranged as a syphon line to syphon off the decanted liquid while in other installations the decanted liquid must be pumped from the decanter receptacle. In the embodiment illustrated, a decanter pump 79 is provided and driven by a motor 79a. The pump is preferably mounted on the decanter receptacle with its intake communicating with the decanter outlet. Alternatively, the pump 79 could be located at some other location in line 78.

As previously described, the decanter is operated to its open condition only during the decant phase of the sequential batch reactor system and is closed during the other phases. A simplified schematic electrical circuit is illustrated in FIG. 4 for operating the decanter. The motor 52 is of the reversible electric type and has one terminal 52a connected through the normally closed contacts 76b of "up" limit switch 75 and the normally open switch contacts of a control switch 81 to a power supply conductor 82. Actuator motor 52 has a second terminal 52b connected through normally closed switch contacts 75b of "down" limit switch 75 and normally open control switch 83 to conductor 82. The other terminal 52c of motor 52 is connected to a second power conductor 84. Control switch 83 may be actuated as by a timer, a microprocessor that controls the sequencing batch reactor, or even manually at the time it is desired to start the decant cycle. When the switch 83 is closed, motor 50 is energized in a direction to move the actuator member 51 down until the crosshead 57 operates the down limit switch 75 and opens switch contacts 75b. The timer or other means used for operating switch 83 is arranged to hold it closed until the actuator member moves down to the open position of the decanter receptacle. Operation of the decanter pump, if one is provided, is peferably delayed until the decanter receptacle is moved to its lower open position. As schematically shown in FIG. 4, normally open switch contacts 76c are connected in a series circuit with a motor start relay MSR for starting the pump motor 79a when switch 75c is closed. Switch contacts 75c are arranged to be closed when the actuator member 51a moves the decanter receptacle to its open position and switch contacts 75c can be conveniently mounted adjacent lower limit switch 75 or form a part thereof, so as to be actuated when switch 75 is activated.

At the end of the decant cycle control switch 81 is closed for a time sufficient to effect raising of the decanter receptacle. This switch can be operated by a float that senses when the liquid level in the basin drops to a preselected minimum decant level, or it can be operated by a timer or a microprocessor that controls the overall sequencing batch reactor, or even manually. When control switch 81 is closed, the motor 52 is energized to raise the actuator member 51a until "up" limit switch 76b is opened. As previously described, switch 76 is positioned so that the actuator raises the decanter receptacle to its closed position and travels a little farther to compress spring 65 and yieldably press the rim on the decanter against the seal 40.

The embodiments of the invention in which an exclusive property or privilege is claimed are defined as follows:

1. A floating decanter apparatus comprising, float means for buoyantly supporting the decanter apparatus in a body of liquid and having an underside, a decanter receptacle disposed below the float means and having an open top surrounded by a peripheral upper decanter rim and outlet means for decanted liquid communicating with said decanter receptacle at a level below said decanter rim, discharge means communicating with said outlet means for discharging decanted liquid from the decanter receptacle, means mounting the decanter receptacle on the float means for movement toward and away from the underside of the float means, seal means operative when the decanter receptacle is moved toward the float means to a preselected raised position for sealing the decanter rim to the underside of the float means sufficient to at least substantially prevent flow of liquid from the body of liquid into the decanter receptacle; and power operated actuator means mounted on the float and operatively connecting to the decanter receptacle for selectively moving the decanter receptacle from a lower position in which the decanter rim spaced below the underside of the float means to said preselected raised position to seal the decanter rim to the underside of the float means.

2. A floating decanter apparatus according to claim 1 wherein said power operated actuator means has a reversible electro-responsive operator.

3. A floating decanter apparatus according to claim 1 wherein said power operated actuator includes linear actuator means having a reversible electric drive motor, first limit switch means for sensing when said linear actuator means reaches a first position and second limit switch means for sensing when said linear actuator means reaches a second position, circuit means including said first and second limit switch means for reversibly applying power to said reversible electric drive motor, said linear actuator means being operatively connected to said decanter receptacle such that the decanter receptacle is in said lower position when the linear actuator means is in said first position.

4. A floating decanter apparatus according to claim 3 wherein said discharge means includes a pump having an inlet connected to said outlet means and a pump drive motor, and means operative when the decanter receptacle is moved to its open position for initiating energization of said pump drive motor.

5. A floating decanter apparatus according to claim 1 wherein said peripheral decanter rim has a generally circular configuration, said means mounting the decanter receptacle on the float means including an elongated guide member disposed generally coaxial with said decanter rim and means on the float means guidably engaging said elongated guide member.

6. A floating decanter apparatus according to claim 1 wherein said power operated actuator means is operatively connected to said decanter receptacle through overtravel spring means arranged to limit the force applied to said decanter receptacle when it reaches said preselected raised position.

7. A floating decanter apparatus according to claim 1 wherein the decanter receptacle has a generally circular peripheral rim and said outlet means is located in the bottom of the decanter receptacle generally coaxially with the rim, and a plurality of baffle means in the decanter receptacle extending from the center to the outer peripheral rim and dividing the decanter receptacle into a plurality of sectors each communicating at its radially inner end with the outlet means to substantially equalize inflow of liquid around the peripheral rim.

8. A floating decanter apparatus comprising float means adapted to float in a body of liquid and having upper and lower sides, a decanter receptacle disposed below the float means and having an open top surrounded by a peripheral decanter rim and outlet means for decanted liquid communication with the decanter receptacle at a level below the decanter rim, an elongated guide member on the decanter receptacle extending generally perpendicular to a plane through the decanter rim at a location centrally of the rim, guide means on the float slidably engaging said guide member and mounting the decanter receptacle on the float means for movement toward and away from the float means, linear actuator means mounted on the float means and having a reversible electric drive motor, means operatively connecting the linear actuator means to the member to move the decanter receptacle from a lower position in which the decanter rim is spaced below the underside of the float means and a preselected raised position, and seal means operative when the decanter receptacle is in said preselected raised position for sealing the decanter rim to the underside of the float means sufficient to at least substantially prevent flow of liquid from the body of liquid into the decanter receptacle.

9. A floating decanter apparatus according to claim 8 wherein said means operatively connecting said linear actuator means to said guide member includes a first spring abutment mounted for limited axial movement relative to said guide member, a second spring abutment fixedly connected to said guide member at a location above said first spring abutment, a compression type overtravel spring means interposed between said first and second spring abutments, and means operatively interconnecting same actuator means to said first spring abutment means for moving said first spring abutment means from a lower position when the linear actuator means is in a first position to a raised position when the linear actuator means is in a second position, said linear actuator means being operative to move said decanter receptacle to said raised position thereof before said actuator means reaches said second position thereof whereby continued movement of the actuator means to said second position compresses said overtravel spring means to yieldably press the rim on the decanter receptacle against the lower side of the float means.

10. A floating decanter apparatus according to claim 9 including first limit switch means for sensing when the actuator means is in its first position and second limit switch means for sensing when the actuator means is in its second position, and circuit means including said first and second limit switch means for reversibly applying power to said drive motor.

11. A floating decanter apparatus according to claim 10 wherein said outlet means includes a pump having a pump drive motor, and means operative when said actuator means moves the decanter receptacle to an open position for initiating energization of said pump drive motor.

12. A floating decanter apparatus according to claim 8 wherein said rim has a generally circular configuration concentric with said member.

13. A floating decanter apparatus according to claim 12 including a plurality of baffles in the decanter receptacle extending from the center to the outer periphery of the decanter rim and dividing the decanter receptacle into a plurality of sectors each communicating at its radially inner end with the outlet means to substantially equalize inflow of liquid around the peripheral rim.

* * * * *